(12) United States Patent
Kurusu et al.

(10) Patent No.: US 6,321,887 B1
(45) Date of Patent: Nov. 27, 2001

(54) SUSPENSION CONTROL APPARATUS (75) Inventors: Akinori Kurusu, Kanagawa-ken; Masaaki Uchiyama, Tokyo; Kenichi Nakamura, Kanagawa-ken, all of (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 09/605,988

(22) Filed: Jun. 29, 2000

(30) Foreign Application Priority Data

Jun. 30, 1999 (JP) .................................................. 11-186130

(51) Int. Cl.[7] .......................... B60G 17/08; B60G 17/015
(52) U.S. Cl. ...................... 188/266.2; 701/37; 280/5.515
(58) Field of Search .................. 267/64.16, 64.11, 267/64.17, 64.15; 701/37, 38; 188/282.2, 266.4, 266.6, 266.2, 266.3, 280, 282.3, 282.4, 266.5; 280/5.515, 5.507, 5.503, 5.514, DIG. 1, 124.157, 124.1

(56) References Cited

U.S. PATENT DOCUMENTS 5,533,597 * 7/1996 Nezu et al. ........................ 280/124.1

FOREIGN PATENT DOCUMENTS

2208108 * 8/1990 (JP) .
4-274917 9/1992 (JP) .

* cited by examiner

*Primary Examiner*—Douglas C. Butler
(74) *Attorney, Agent, or Firm*—Wenderoth, Lind & Ponack, L.L.P.

(57) ABSTRACT

When a hydraulic cylinder apparatus operates in a direction such that the same damping force as a skyhook damping force cannot be produced, a command signal is applied so as to operate an active system (a fluid supply/discharge valve) and supply or discharge a fluid relative to the hydraulic cylinder apparatus, to thereby provide compensation of the damping force and obtain a desired damping force (shock-absorbing function). It is unnecessary to continuously supply or discharge the fluid through the active system and energy consumption can be reduced as compared to a conventional active control.

7 Claims, 7 Drawing Sheets

CURRENT : COMMAND CURRENT
OBTAINED BY SKYHOOK CALCULATION

SUSPENSION CONTROL APPARATUS

BACKGROUND OF THE INVENTION

The present invention relates to a suspension control apparatus for a vehicle, such as an automobile or a rail carriage.

In terms of suspension control, an ideal standard is defined by the so-called skyhook theory, whereby a spring is provided between a sprung mass and an unsprung mass and one damper is provided between the sprung mass and a fixed point in air above the sprung mass. By this arrangement, a damping force equal to the product of a vertical velocity of the sprung mass and a damping coefficient of the damper is applied to the sprung mass.

However, in actual practice, it is not possible to fix a damper at a point in air above a sprung mass, and such a damper must be positioned between the sprung mass and the unsprung mass. In this arrangement, in order to obtain substantially the same suspension characteristics as those which would be provided by the ideal damper positioning defined in the skyhook theory, it is necessary for a fluid to be supplied to or discharged from a damper, to thereby enable frequent changes in the length of the damper. To effect such fluid control, a large capacity fluid supply system is required. Such a control provided with a large capacity supply system is referred to an active suspension control.

In Unexamined Japanese Patent Application Public Disclosure (Kokai) No. 5-330325 (corresponding to U.S. Pat. No. 5,533,597), the inventors have proposed a suspension control apparatus which provides suspension characteristics analogous to those which would be provided by a damper obtained by the skyhook theory, without the need for a large capacity fluid supply system. In this apparatus, vibration of a vehicle body is suppressed by adjusting a damping coefficient (hence a damping force) of a variable damping coefficient type shock absorber. This control is referred to as a semi-active suspension control.

In the suspension control apparatus of Kokai No. 5-330325, vertical acceleration of a vehicle body is detected and an absolute vertical velocity of the vehicle body is determined by obtaining an integrated value, based on a signal which corresponds to the detected acceleration. Then, a damping force based on the skyhook theory is calculated from the absolute vertical velocity, and a semi-active shock absorber (a variable damping coefficient type shock absorber) provided between the vehicle body and an axle is controlled, so as to generate a damping force equivalent to that of the skyhook damper. The method of this control will be explained later in detail.

SUMMARY OF THE INVENTION

It is an object of the present invention to provide a suspension control apparatus which is capable of effecting active suspension control without the need for a large capacity fluid supply system.

A suspension control apparatus of the present invention comprises a suspension body provided between a vehicle body and an axle of a vehicle, which generates a variable damping force so as to perform a shock-absorbing function relative to the vehicle body. A fluid supply/discharge means is provided for selectively supplying and discharging a fluid relative to the suspension body. The suspension control apparatus also comprises a vibration monitoring means for monitoring vibration of the vehicle body and a control means for controlling the shock-absorbing function of the suspension body. The control means is adapted to control the shock-absorbing function by controlling the damping force of the suspension body and selectively supplying and discharging the fluid relative to the suspension body, in response to a signal emitted from the vibration monitoring means. When a satisfactory shock-absorbing function cannot be achieved by controlling the damping force of the suspension body, the control means performs the shock-absorbing function by supplying and discharging the fluid through the fluid supply/discharge means relative to the suspension body.

In one embodiment of the present invention, the control means controls the shock-absorbing function, based on the skyhook theory.

In the present invention, the suspension body may be a shock absorber of a type having damping force characteristics which reverse between an extension stroke and a compression stroke.

The foregoing and other objects, features and advantages of the present invention will be apparent from the following detailed description and appended claims taken in connection with the accompanying drawings.

DETAILED DESCRIPTION OF THE INVENTION

Figure 7:
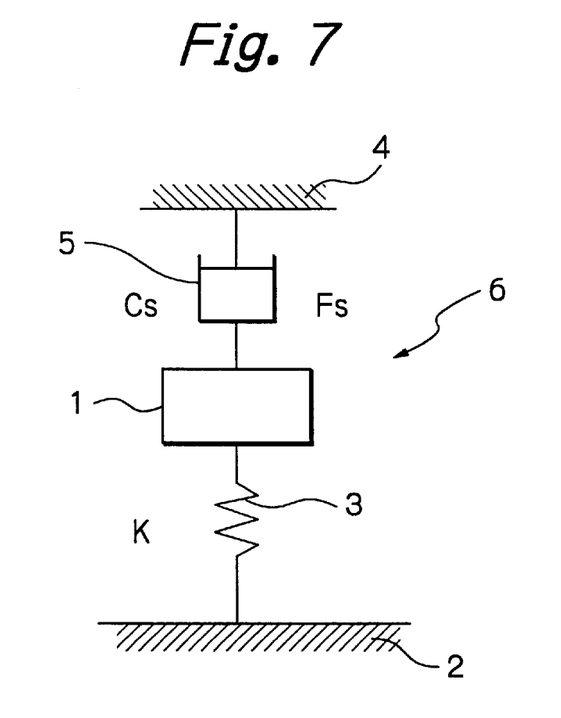
FIG. 7 is a schematic illustration of a skyhook system.
Figure 8:
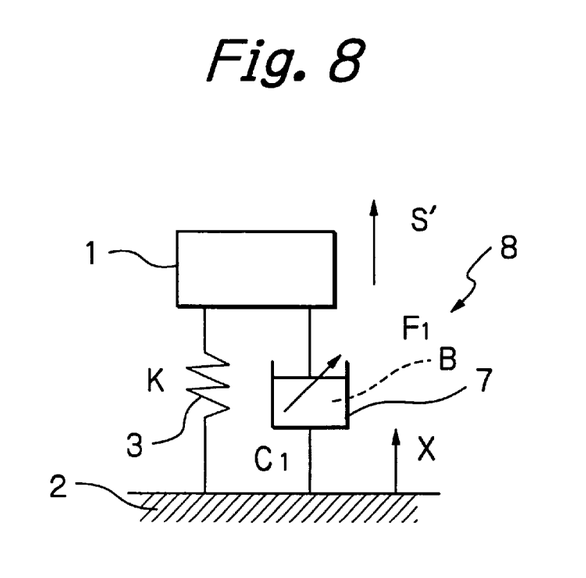
FIG. 8 is a schematic illustration of a semi-active system.

In the above-mentioned control based on the skyhook theory, comparison is made between a skyhook system 6 and a semi-active system 8 such as mentioned below. As shown in FIG. 7, the skyhook system 6 comprises a spring 3 having a spring constant K provided between a vehicle body 1 (a sprung mass) and a road surface 2 (or an axle) and a skyhook damper 5 having a damping coefficient $C_s$ provided between the vehicle body 1 and a sky 4. As shown in FIG. 8, the semi-active system 8 comprises a spring 3 and a semi-active shock absorber 7 (a variable damping coefficient type shock absorber) having a damping coefficient $C_1$, which are provided between the vehicle body 1 and the axle [or the road surface 2 (an unsprung mass)]. A damping force (hence a damping coefficient) of the semi-active shock absorber 7 is adjusted by comparing the semi-active system 8 with the skyhook system 6 and conducting a calculation as mentioned below so that a damping force $F_1$ (hence a damping coefficient) of the semi-active shock absorber 7 becomes approximate to (preferably equal to) a damping force $F_s$ of the skyhook damper 5 of the skyhook system 6.

That is, the damping coefficient $C_1$ of the semi-active shock absorber 7 is adjusted as follows:

When S' (S'−X)>0 [S': absolute vertical velocity of vehicle body 1; X: absolute vertical velocity of axle (unsprung mass)], $F_1 = -C_s S' = -C_1 (S'-X)$ [$F_1$: damping force of semi-active shock absorber 7], that is, $C_1 = C_s S'/(S'-X)$.

The damping coefficient $C_1$ is adjusted based on this expression.

Further, the damping coefficient $C_1$ of the semi-active shock absorber 7 is adjusted so that when S' (S'−X)<0, $F_1 = 0$, that is, $C_1 = 0$.

The formula S' (S'−X)<0 indicates a state such that, for example, the vehicle body is moving upward while the shock absorber is in the compression stroke. In this state, in accordance with the skyhook theory, it is preferable to exert a downward damping force to the vehicle body. However, in a shock absorber provided between a vehicle body and axle, it is impossible to exert a force downwardly during a compression stroke. Therefore, the damping coefficient $C_1$ is set to 0.

Figure 9:
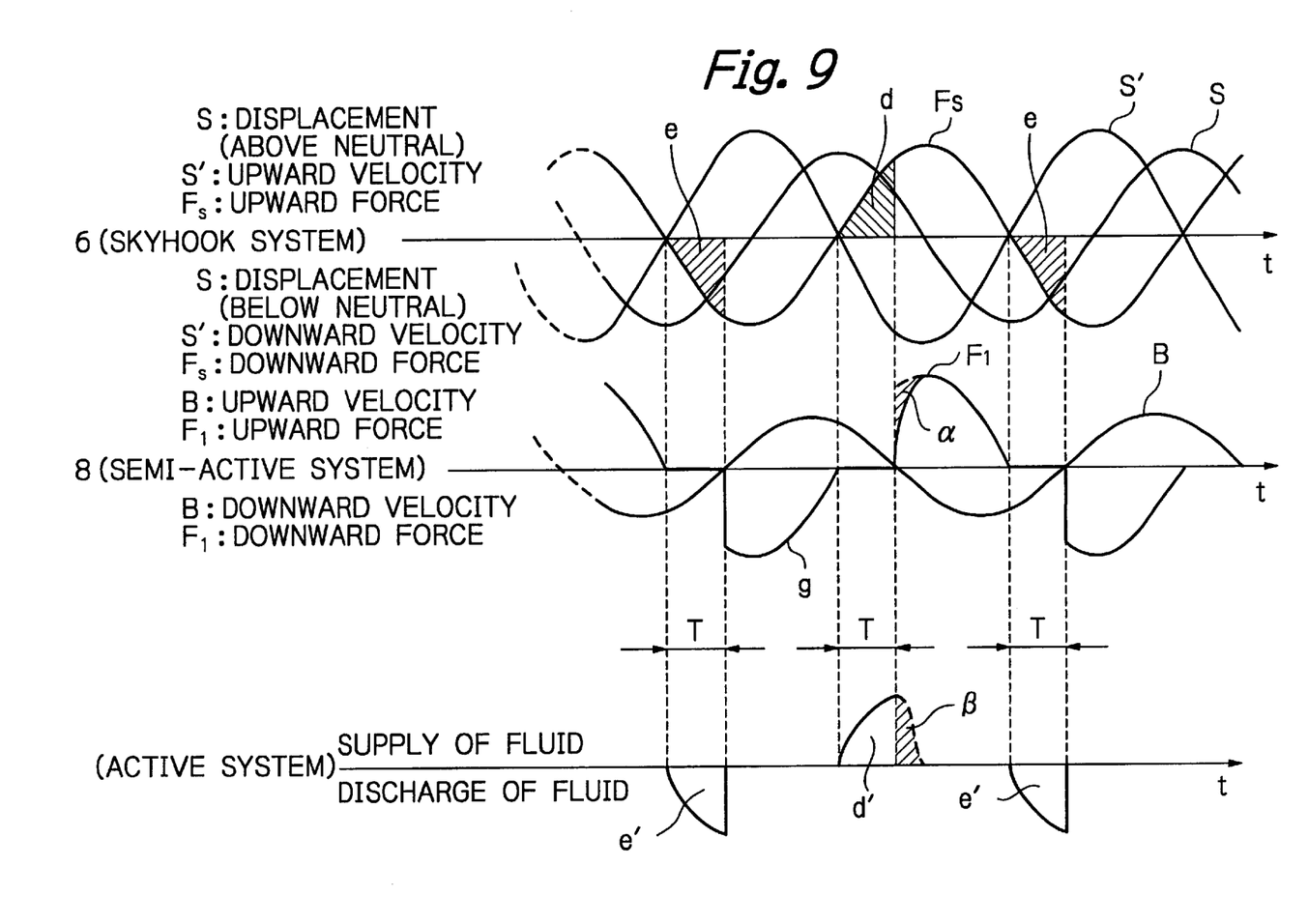
FIG. 9 shows waveforms indicating operation of the skyhook system, the semi-active system, and an active system in FIGS. 1 and 5.

FIG. 9 shows an example of a damping force obtained by the skyhook damper 5 based on the skyhook theory and an example of a damping force generated by the semi-active shock absorber 7 which is made approximate to the damping force of the skyhook damper, together with a absolute vertical velocity of the vehicle body 1, etc. In FIG. 9, S, S', B, $F_s$ and $F_1$ indicate the following items.

S: absolute vertical displacement of vehicle body 1
S': absolute vertical velocity of vehicle body 1
B: piston velocity of semi-active shock absorber 7
$F_s$: damping force of skyhook damper 5
$F_1$: damping force of semi-active shock absorber 7

In the above-mentioned prior art in which a damping force is controlled based on the skyhook theory, as shown in FIG. 9, the damping force $F_1$ of the semi-active shock absorber 7 generally coincides with the damping force $F_s$ of the skyhook damper 5 of the skyhook system 6. However, a magnitude of the damping force $F_1$ of the semi-active shock absorber 7 does not coincide with that of the damping force $F_s$ of the skyhook damper 5 in a region corresponding, for example, to a hatched portion d of the damping force $F_s$ [a region corresponding to a time T; a region in which the direction of the piston velocity B differs from the direction of the damping force $F_s$ of the skyhook damper 5 (the phase of which (Fs) is shifted 180 degrees with respect to that of the absolute vertical velocity S')].

The reason for this is as follows. When an upward force (a damping force for a compression stroke) such as is indicated by the hatched portion a is required in the skyhook damper 5, the semi-active shock absorber 7 is in an extension stroke and thus cannot generate a damping force of the compression stroke (the semi-active shock absorber 7 is capable of generating a damping force only in a direction opposite to the direction of the stroke of the piston). Therefore, the damping force for the extension stroke is set to a minimum value (0).

Thus, in the semi-active system 8, vibration of the vehicle body is suppressed by controlling the damping force. Consequently, it is possible to provide a light weight, low cost shock-absorbing system. However, in comparison to the active system, a shock-absorbing effect of the semi-active system 8 is unsatisfactory, because the same damping force as the damping force $F_s$ of the skyhook damper 5 cannot be produced as desired in the regions of time T (for example, a region corresponding to the hatched portion d).

Hereinbelow, referring to FIGS. 1 to 4 and 9, description is made with regard to a suspension control apparatus in a first embodiment of the present invention.

Figure 1:
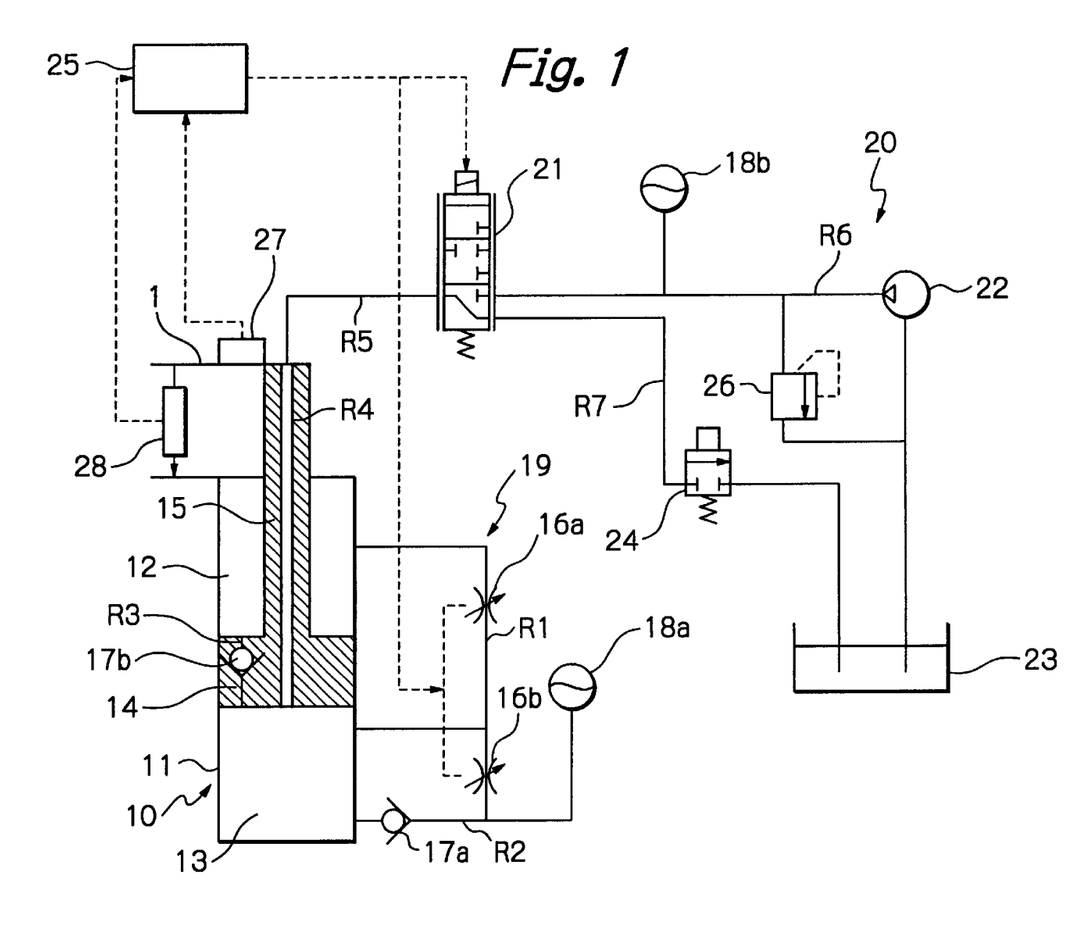
FIG. 1 is a schematic illustration of a suspension control apparatus according to a first embodiment of the present invention.

In FIG. 1, a hydraulic cylinder apparatus 10 is provided between the vehicle body 1 and an axle (not shown). The hydraulic cylinder apparatus 10 generally comprises: a cylinder body 11 fixed on a side of the axle; a piston 14 which divides the inside of the cylinder body 11 into an upper cylinder chamber 12 and a lower cylinder chamber 13 and which is adapted to slidably move within the cylinder body 11; and a piston rod 15. The piston rod 15 has one end connected to the piston 14. The other end of the piston rod 15 extends through the upper cylinder chamber 12 to the outside of the cylinder body 11 and is fixed to the vehicle body 1.

The upper cylinder chamber 12 and the lower cylinder chamber 13 communicate with each other through a first flow path R1 having an extension-stroke damping force valve 16a provided therein. A portion of the first flow path R1 on a side of the lower cylinder chamber 13 communicates with the lower cylinder chamber 13 through a second flow path R2 having a compression-stroke damping force valve 16b and a first check valve 17a provided therein. A first accumulator (reservoir) 18a for high pressure is connected to the second flow path R2 between the compression-stroke damping force valve 16b and the first check valve 17a. The first accumulator 18a communicates with the lower cylinder chamber 13 through the first check valve 17a. The first accumulator 18a is adapted to apply a part of the force for sustaining the load of the vehicle body.

A third fluid path R3 is formed in the piston 14 so as to permit communication between the upper cylinder chamber 12 and the lower cylinder chamber 13. A second check valve 17b is provided in the third flow path R3 so as to inhibit a flow of a hydraulic fluid from the upper cylinder chamber 12 to the lower cylinder chamber 13. The extension-stroke damping force valve 16a and the compression-stroke damping force valve 16b provide a damping force generating portion 19 capable of effecting semi-active control. In this embodiment, the hydraulic cylinder apparatus 10 and the damping force generating portion 19 comprise a suspension body.

Figure 2:
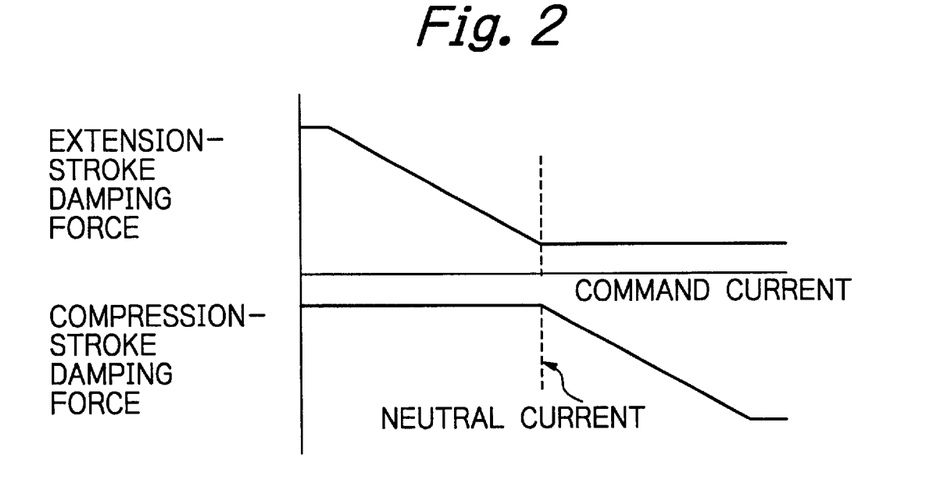
FIG. 2 is a graph showing a relationship between a damping force and a command current with respect to a damping force generating portion in FIG. 1.

In the damping force generating portion 19, the extension-stroke damping force valve 16a and the compression-stroke damping force valve 16b are operated in cooperation with each other. FIG. 2 shows damping force characteristics of the damping force generating portion 19 when the piston 14 moves at a certain velocity. As shown in FIG. 2, the damping force characteristics of the damping force generating portion 19 reverse between the extension stroke and the compression stroke.

Illustratively stated, normally, a control current (a command current) is set to a neutral current and both the damping force for the extension stroke and the damping force for the compression stroke are set to be small. When the control current is gradually decreased from the neutral current (a left side of FIG. 2), damping force characteristics change so that the damping force for the compression stroke is small while the damping force for the extension stroke is large. On the other hand, when the control current is gradually increased from the neutral current (a right side of FIG. 2), damping force characteristics change so that the damping force for the extension stroke is small while the damping force for the compression stroke is large.

A fourth flow path R4 is formed so as to extend through the piston 14 and the piston rod 15 of the hydraulic cylinder apparatus 10. One end of the fourth flow path R4 opens to the lower cylinder chamber 13 and the other end of the fourth flow path R4 opens at the end of the piston rod 15 opposite the piston 14.

The fourth flow path R4 in the hydraulic cylinder apparatus 10 communicates with a fifth flow path R5. The fifth flow path R5 is connected to a fluid supply/discharge valve 21 (a fluid supply/discharge means; a flow rate control valve in this embodiment) which provides a part of an active system 20. The fluid supply/discharge valve 21 is connected to a tank 23 (a fluid supply portion) through a sixth fluid path R6 having a pump 22 provided therein. The fluid supply/discharge valve 21 is also connected to the tank 23 (a fluid discharge portion) through a seventh fluid path R7 having a fluid discharge valve 24 provided therein.

The fluid supply/discharge valve 21 is controlled by a below-mentioned control device 25. The control device 25 selectively opens and closes a communication path between the fifth flow path R5 and each of the flow paths R6 and R7. Illustratively stated, under control of the control device 25, the fluid supply/discharge valve 21 is switched between a fluid discharge mode, a shutting mode and a fluid supply mode. In the fluid discharge mode (FIG. 1), the fluid supply/discharge valve 21 permits communication between the fifth flow path R5 and the seventh flow path R7 and prevents communication between the fifth flow path R5 and the sixth flow path R6. In the shutting mode, the fluid supply/discharge valve 21 prevents communication between the fifth flow path R5 and the seventh flow path R7 and also prevents communication between the fifth flow path R5 and the sixth flow path R6. In the fluid supply mode, the fluid supply/discharge valve 21 permits communication between the fifth flow path R5 and the sixth flow path R6 and prevents communication between the fifth flow path R5 and the seventh flow path R7. Normally, the fluid supply/discharge valve 21 is set to the shutting mode.

The sixth flow path R6 is branched on a side of the fluid supply/discharge valve 21 and connected to a second accumulator 18b. A relief valve 26 set for a high-pressure is provided in the sixth flow path R6 on a side of the pump 22. In this embodiment, the fluid supply/discharge valve 21, the pump 22 and the tank 23 provide the active system 20.

Figure 3:
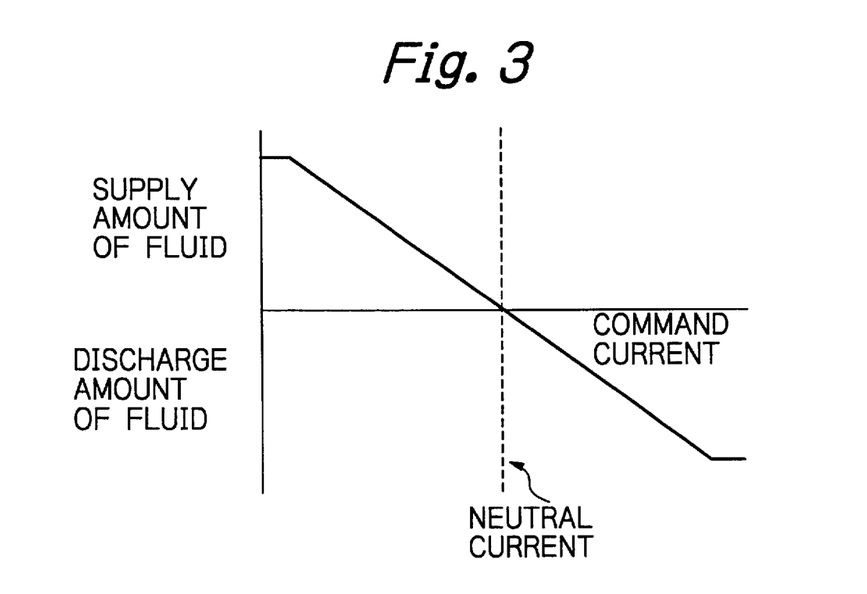
FIG. 3 is a graph showing a relationship between the supply/discharge amount of a fluid and a command current with respect to a fluid supply/discharge valve in FIG. 1.

The characteristics of the fluid supply/discharge valve 21 are shown in FIG. 3. That is, when a control current (a command current) is a neutral current, each of the supply amount and the discharge amount of the fluid is zero (0). When the control current becomes lower than the neutral current (a left side of FIG. 3; the fluid supply mode), supply of the fluid is started. When the control current is higher than the neutral current (a right side of FIG. 3; the fluid discharge mode), discharge of the fluid is conducted.

An acceleration sensor 27 (a vibration monitoring means) is connected to the vehicle body 1, so as to monitor a vertical acceleration of the vehicle body 1. A displacement sensor 28 is connected to the hydraulic cylinder apparatus 10, so as to detect relative displacement between the piston rod 15 and the cylinder body 11.

The acceleration sensor 27, the displacement sensor 28, the fluid supply/discharge valve 21, the extension-stroke damping force valve 16a and the compression-stroke damping force valve 16b are connected to the control device 25 (a control means).

The control device 25 controls the fluid supply/discharge valve 21, the extension-stroke damping force valve 16a and the compression-stroke damping force valve 16b in response to a signal emitted from the displacement sensor 28 and a signal emitted from the acceleration sensor 27.

Figure 4:
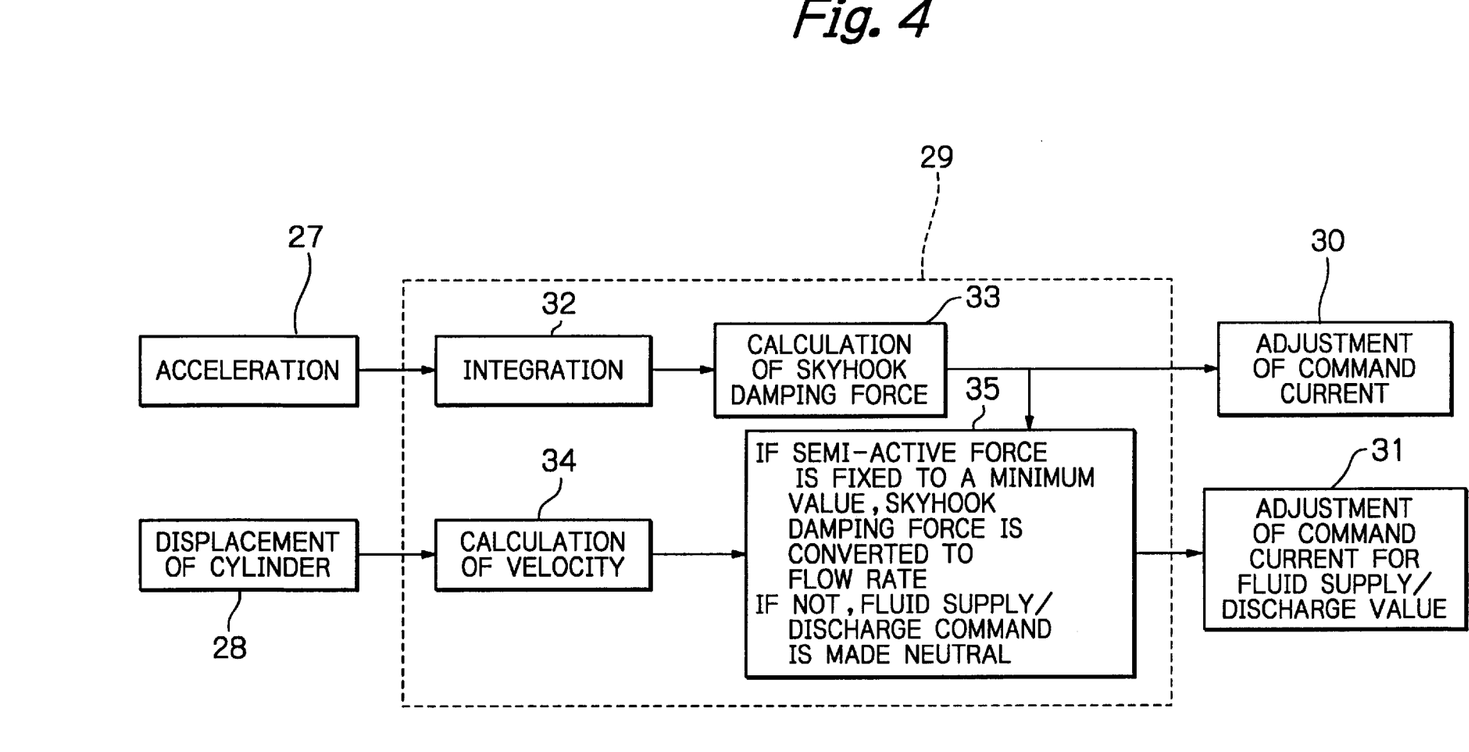
FIG. 4 is a schematic illustration of a skyhook control portion of the suspension control apparatus of FIG. 1.

As shown in FIG. 4, the control device 25 comprises a skyhook control portion 29, a command current adjusting portion 30 and a fluid supply/discharge valve adjusting portion 31. The skyhook control portion 29 generally comprises: an integration circuit 32 for determining a vertical velocity by obtaining an integrated value, based on the signal from the acceleration sensor 27; a skyhook damping force calculating portion 33 for determining the skyhook damping force $F_s$, based on the vertical velocity determined by the integration circuit 32; a piston velocity calculating portion 34 for determining the velocity of the piston 14, based on the signal from the displacement sensor 28; and a main calculating portion 35 for determining the command current for the fluid supply/discharge valve 21, based on the signals from the skyhook damping force calculating portion 33 and the piston velocity calculating portion 34.

The skyhook damping force calculating portion 33 is connected to the command current adjusting portion 30, so as to control the extension-stroke damping force valve 16a and the compression-stroke damping force valve 16b of the damping force generating portion 19. The main calculating portion 35 is connected to the fluid supply/discharge valve adjusting portion 31, so as to control the fluid supply/discharge valve 21.

In the main calculating portion 35, when the direction of operation of the hydraulic cylinder apparatus 10 (the direction of the velocity of the piston 14 which is determined by the piston velocity calculating portion 34) is a direction such that a force generated by the cylinder apparatus 10 is in the same direction as that of the skyhook damping force determined by the skyhook damping force calculating portion 33, the command current for the fluid supply/discharge valve 21 is set to the neutral current and the supply amount and the discharge amount of the fluid are set to zero (0).

On the other hand, when the hydraulic cylinder apparatus 10 operates in a direction such that a force analogous to the skyhook damping force cannot be produced [see the hatched portions d and e in FIG. 9 (the regions of time T)], the command current is set to be higher or lower than the neutral current, so as to activate the active system 20 (the fluid supply/discharge valve 21). Consequently, the fluid is supplied to or discharged from the hydraulic cylinder apparatus 10 (as indicated by reference characters d' and e' in FIG. 9) for compensation to thereby obtain a desired damping force (shock-absorbing function).

For example, when generation of an upward force is required in a region corresponding to the hatched portion d where the hydraulic cylinder apparatus 10 is in the extension stroke, the hydraulic cylinder apparatus 10 cannot generate a force equivalent to the required force. Therefore, the fluid is supplied to the hydraulic cylinder apparatus 10 (as indicated by d' in FIG. 9; the fluid supply mode), thus generating an upward force as required.

When the hydraulic cylinder apparatus 10 is in the compression stroke as in a region corresponding to the hatched portion e in FIG. 9, a downward force is generated only in this required period of time, by discharging the fluid from the hydraulic cylinder apparatus 10 through the fluid supply/discharge valve 21 (as indicated by e' in FIG. 9; the fluid discharge mode).

It should be noted that since the hydraulic cylinder apparatus 10 sustains a part of the load of the vehicle body 1 and, therefore, an upward force works in a neutral state. A "downwards" force means that the force becomes lower than that of the neutral state. The terms "upward" and "downward" used in connection with the force exerted by the cylinder apparatus is determined relative to the neutral state.

Thus, in the first embodiment of the present invention, the fluid supply/discharge means (the fluid supply/discharge valve 21) is operated only when a desired shock-absorbing function cannot be achieved by means of the damping force of the suspension body (the damping force generating portion 19) (in the regions of time T in FIG. 9). It is unnecessary to continuously supply or discharge the fluid through the active system 20. Therefore, energy consumption can be reduced as compared to the conventional active control. For example, the shock-absorbing function can be controlled by means of an energy expenditure of about ½ that required in the conventional technique.

In the conventional active control, various members such as a pump and an accumulator are required to have a large capacity, leading to an increase in size of the apparatus. On the other hand, in this embodiment of the present invention, the fluid supply/discharge means (the fluid supply/discharge valve 21) is operated only when a desired shock-absorbing function cannot be achieved by means of the damping force of the suspension body (the damping force generating portion 19) (in the regions of time T in FIG. 9). Therefore, the capacity of each member providing the active system 20 can be minimized, and each member (the pump 22, the accumulator 18b and the fluid supply/discharge valve 21) can be provided for each wheel. Therefore, a number of pipes provided within the vehicle in the conventional active control can be eliminated. Further, a reduction in size of the apparatus is facilitated and mountability of the apparatus relative to the vehicle is enhanced.

Thus, when each member shown in FIG. 1 is provided for each wheel, it is unnecessary to provide a pipe (such as a hydraulic pipe or a pneumatic pipe) for distributing the fluid to the cylinder at each wheel. By this arrangement, the risk of pipe breakage can be reduced, thereby providing a highly safe and easily maintained system.

Further, the fluid supply/discharge means, together with the semi-active control, achieves a controlling effect equivalent to that of the conventional active control.

Further, the changeover to the active control can be conducted automatically, so that calculation in the control device 25 and a construction of the suspension control apparatus can be simplified.

Next, the suspension control apparatus in a second embodiment of the present invention is described with reference to FIGS. 5 and 6, together with FIG. 1.

Figure 5:
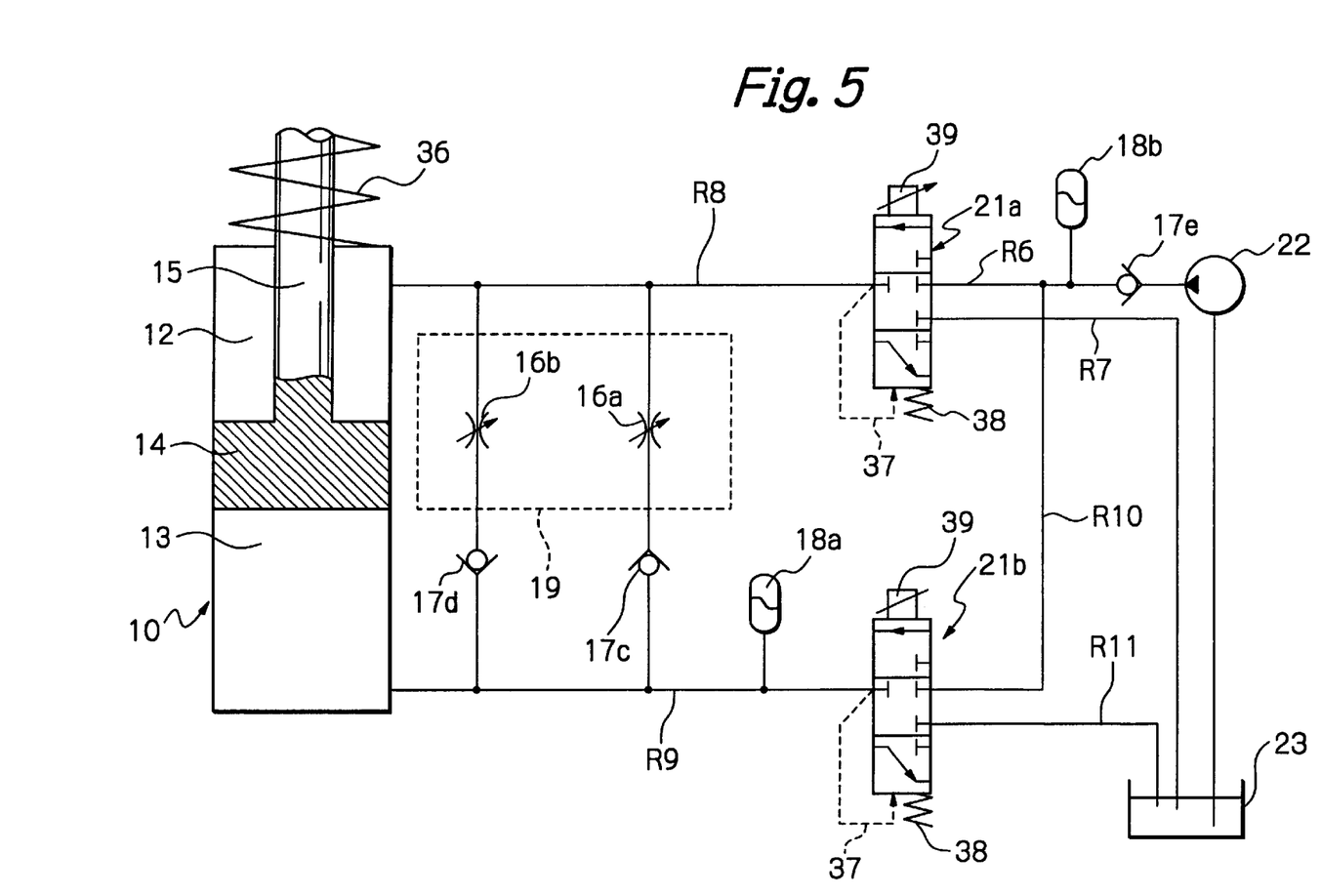
FIG. 5 is a schematic illustration of a suspension control apparatus according to a second embodiment of the present invention.
Figure 6:
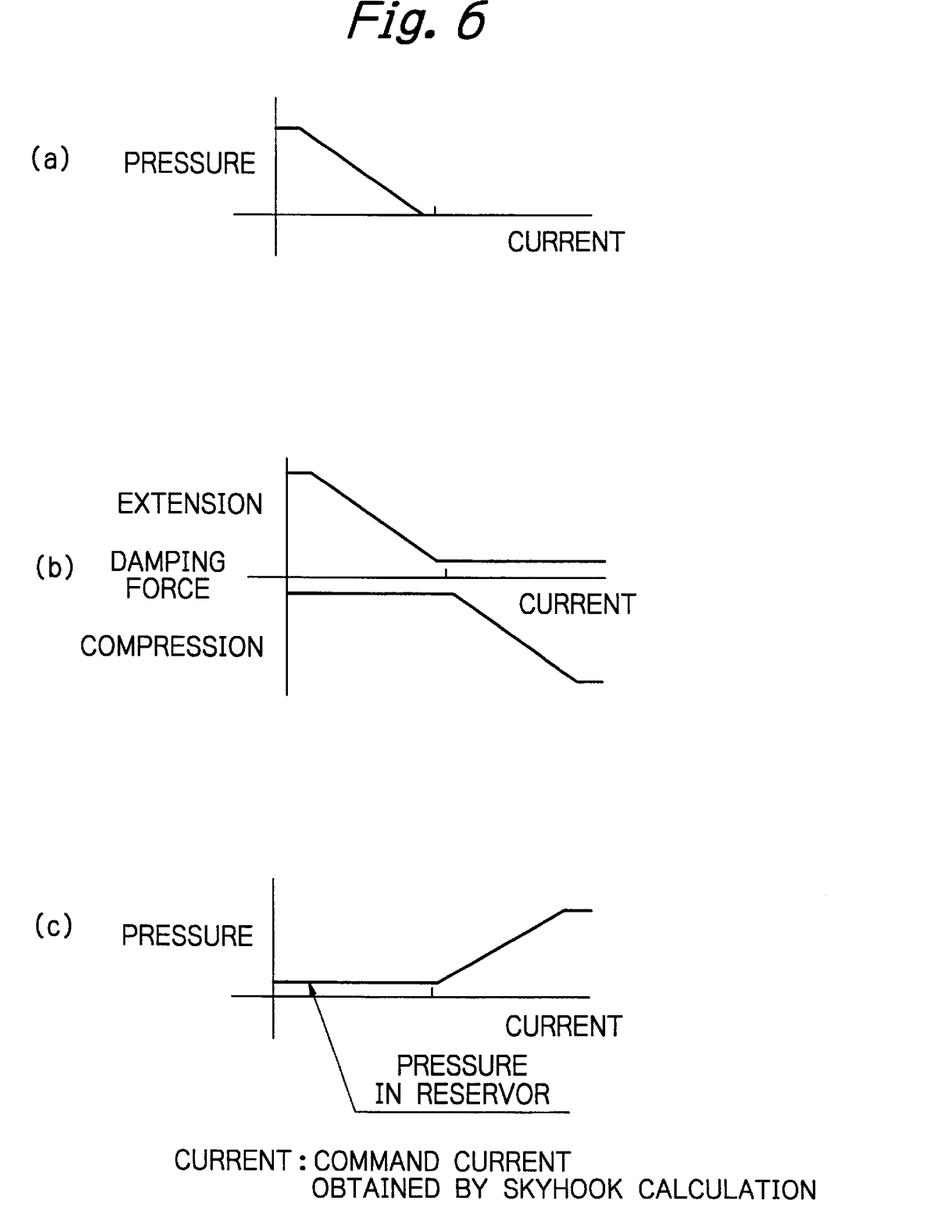
FIG. 6 shows graphs indicating operation of the suspension control apparatus of FIG. 5.

In FIG. 5, a bias means 36 such as a spring is provided between the cylinder body 11 of the hydraulic cylinder apparatus 10 and the vehicle body 1. As in the case of the first embodiment, the first accumulator 18a is adapted to apply a part of the force for sustaining the load of the vehicle body.

The extension-stroke damping force valve 16a and a third check valve 17c connected in series are connected to the upper cylinder chamber 12 and the lower cylinder chamber 13. The third check valve 17c permits a flow of the fluid only in a direction from the upper cylinder chamber 12 to the lower cylinder chamber 13. Likewise, the compression-stroke damping force valve 16b and a fourth check valve 17d connected in series are connected to the upper cylinder chamber 12 and the lower cylinder chamber 13. The fourth check valve 17d permits a flow of the fluid only in a direction from the lower cylinder chamber 13 to the upper cylinder chamber 12. The extension-stroke damping force valve 16a and the compression-stroke damping force valve 16b and the related things provide the damping force generating portion 19 capable of effecting semi-active control. As shown in FIG. 6(b), the damping force generating portion 19 has damping force characteristics which reverse between the extension stroke and the compression stroke.

A first fluid supply/discharge valve 21a is connected to the upper cylinder chamber 12 through an eighth flow path R8. A second fluid supply/discharge valve 21b is connected to the lower cylinder chamber 13 through a ninth flow path R9.

The first fluid supply/discharge valve 21a is connected to the tank 23 (the fluid supply portion) through the sixth flow path R6 having the pump 22 provided therein. A fifth check valve 17e is provided in the sixth flow path R6. The first fluid supply/discharge valve 21a is also connected to the tank 23 (the fluid discharge portion) through the seventh flow path R7. The first fluid supply/discharge valve 21a has a pilot path 37 connected to the eighth flow path R8 (hence the upper cylinder chamber 12), a valve bias means 38 such as a spring and a pressure adjusting means 39. The pilot path 37 communicates with the upper cylinder chamber 12 through the eighth flow path R8, so that the pressure in the upper cylinder chamber 12 can be utilized as a pilot pressure in the first fluid supply/discharge valve 21a.

The second fluid supply/discharge valve 21b is connected through a tenth flow path R10 to the sixth flow path R6 and is adapted to receive the fluid supplied through the pump 22. The second fluid supply/discharge valve 21b is also connected to the tank 23 (the fluid discharge portion) through an eleventh flow path R11. The second fluid supply/discharge valve 21b comprises the pilot path 37 connected to the ninth flow path R9 (hence the lower cylinder chamber 13), the valve bias means 38 and the pressure adjusting means 39. The pilot path 37 communicates with the lower cylinder chamber 13 through the ninth flow path R9, so that the pressure in the lower cylinder chamber 13 can be utilized as a pilot pressure in the second fluid supply/discharge valve 21b.

As in the case of the fluid supply/discharge valve 21, the first fluid supply/discharge valve 21a and the second fluid supply/discharge valve 21b can be switched between the fluid discharge mode, the shutting mode and the fluid supply mode. In this embodiment, switching between the modes is not conducted under control of the control device 25, but is conducted automatically in accordance with the pilot pressure. Normally, the first fluid supply/discharge valve 21a and the second fluid supply/discharge valve 21b are set to the shutting mode. The first fluid supply/discharge valve 21a and the second fluid supply/discharge valve 21b are set to the fluid discharge mode when the pilot pressure is high, and set to the fluid supply mode when the pilot pressure is low.

The first fluid supply/discharge valve 21a, the second fluid supply/discharge valve 21b and the pump 22 provide the active system 20.

The first accumulator 18a determines the pressure in the hydraulic cylinder apparatus 10 when the piston 14 is stopped. This pressure determined by the first accumulator 18a is determined as a reference pressure (an initial pressure), and the bias means is preliminarily adjusted so that the first fluid supply/discharge valve 21a and the second fluid supply/discharge valve 21b are in the shutting mode under the initial pressure.

Next, operation of the second embodiment is described.

When the piston 14 is displaced (during the extension stroke or the compression stroke), the damping force generating portion 19, the first fluid supply/discharge valve 21a and the second fluid supply/discharge valve 21b are operated in accordance with the displacement of the piston 14. An operation of the embodiment in the extension stroke and an operation of the embodiment in the compression stroke are substantially the same, except that the damping force generating portion 19 (the extension-stroke damping force valve 16a or the compression-stroke damping force valve 16b) and the fluid supply/discharge means (the first fluid supply/discharge valve 21a or the second fluid supply/discharge valve 21b) are changed to be operated. In the following description, the extension stroke is taken as an example.

The control device 25 applies a signal (command current) to the damping force generating portion 19, the first fluid supply/discharge valve 21a and the second fluid supply/discharge valve 21b at the same time. The first fluid supply/discharge valve 21a and the second fluid supply/discharge valve 21b generate pressures as indicated in graphs (a) and (c) in FIG. 6. When the damping force for the extension stroke is set to hard damping, the control device 25 applies a command signal to the pressure adjusting means 39 so that the pressure adjusting means 39 exerts a downward force (as viewed in FIG. 5) equal to an upward force applied to the first fluid supply/discharge valve 21a due to the effect of the pressure transmitted through the pilot path 37, which pressure is equal to the pressure in the upper cylinder chamber 12. By this arrangement, when a wheel hits a bump on a road surface and the pressure in the upper cylinder chamber 12 sharply decreases, the force transmitted through the pilot path 37 also decreases and the first fluid supply/discharge valve 21a automatically moves in the downward direction as viewed in FIG. 5. Consequently, the first fluid supply/discharge valve 21a is brought into an open position, to thereby permit a flow of the fluid to the upper cylinder chamber 12. On the other hand, when the damping force for the extension stroke is set to soft damping, the control device 25 applies a command signal (command current) to the pressure adjusting means 39 for the shutting mode (FIG. 5).

In the extension stroke of the piston 14, when the extension-stroke damping force valve 16a is set to hard damping for the extension stroke (soft damping for the compression stroke), the force exerted by the pressure adjusting means 39 for the first fluid supply/discharge valve 21a does not exceed the force exerted through the pilot path 37. Therefore, the first fluid supply/discharge valve 21a is closed and a hard damping force (for the extension stroke) is generated by the extension-stroke damping force valve 16a so as to perform a shock-absorbing function. That is, the shock-absorbing function relative to the vehicle body 1 is performed by controlling the damping force of the damping force generating portion 19 (the suspension body).

When the transition from the extension stroke to the compression stroke of the piston 14 occurs due to the unsprung mass hitting a bump on a road surface (while the damping force continues to be a soft setting for the compression stroke), the pressure in the upper cylinder chamber 12 decreases. In this instance, the force exerted through the pilot path 37 reduces and the first fluid supply/discharge valve 21a is opened (to the supply side). Consequently, fluid in an amount corresponding to a hard damping force automatically flows from the first fluid supply/discharge valve 21a into the upper cylinder chamber 12, to thereby provide compensation of the damping force and achieve a desired shock-absorbing function. That is, when a desired shock-absorbing function cannot be achieved by controlling the damping force of the damping force generating portion 19, the first fluid supply/discharge valve 21a is operated, to thereby supply or discharge the fluid relative to the damping force generating portion 19 and generate a damping force (thus performing a shock-absorbing function). Therefore, the same control effect as that of the conventional active system can be achieved and a desired shock-absorbing function can be performed.

When the fluid flows from the first fluid supply/discharge valve 21a into the hydraulic cylinder apparatus 10, an internal pressure of the first accumulator 18a increases and is transmitted through the fourth check valve 17d. When a damping force soft command is provided to the damping force generating portion 19, and the pressure in the first accumulator 18a is higher than the initial pressure, the pressure is transmitted through the fourth check valve 17d to the pilot path 37, to thereby increase the pilot pressure. Due to the high pilot pressure, as mentioned above, the first fluid supply/discharge valve 21a is automatically switched to the fluid discharge mode, to thereby discharge the fluid and decrease the pressure in the first accumulator 18a. When the pilot pressure reaches the initial pressure, the first fluid supply/discharge valve 21a is switched to the shutting mode, thereby stopping the discharge of the fluid. Thus, when a damping force soft command is provided, a damping force which is determined under the initial pressure of the first accumulator 18a is obtained. Normally, a hard/soft command and a soft/hard command are jointly supplied to the damping force generating portion 19, so that pressure compensation for the first accumulator 18a is automatically conducted.

In the compression stroke of the piston 14, the same control operation as that in the extension stroke is conducted, except that the compression-stroke damping force valve 16b (the damping force generating portion 19) and the second fluid supply/discharge valve 21b (the fluid supply/discharge means) are used, instead of the extension-stroke damping force valve 16a (the damping force generating portion 19) and the first fluid supply/discharge valve 21a (the fluid supply/discharge means).

As mentioned above, the first fluid supply/discharge valve 21a or the second fluid supply/discharge valve 21b is operated only when a desired shock-absorbing function cannot be achieved by means of the damping force generated by the damping force generating portion 19 (the suspension body), for example, when the unsprung mass hits a bump on a road surface during the extension stroke. It is unnecessary to continuously supply or discharge the fluid through the first fluid supply/discharge valve 21a or the second fluid supply/discharge valve 21b (the active system 20). Therefore, energy consumption can be reduced as compared with the conventional active control. Further, when a desired shock-absorbing function cannot be achieved by means of the damping force of the damping force generating portion 19 (the suspension body), the first fluid supply/discharge valve 21a or the second fluid supply/discharge valve 21b (the active system 20) is operated, to thereby supply or discharge the fluid and generate a damping force (thus performing a shock-absorbing function). Therefore, the same control effect as that of the conventional active system can be achieved and a desired shock-absorbing function can be performed.

In regard to various problems in shock absorbers, such as compressibility of a hydraulic fluid, it is well-known that it is difficult to create an adequate damping force when a piston speed is low. However, in the present invention, when the damping force is insufficient as indicated by a portion $\alpha$ in FIG. 9, the active system is automatically operated in the above-mentioned manner, to thereby provide compensation of the damping force as is indicated by a portion β in FIG. 9 and prevent a lowering of a shock-absorbing effect.

In a conventional active control system, various members such as a pump and an accumulator are required to have a large capacity, leading to an increase in size of the apparatus. On the other hand, in this embodiment of the present invention, the fluid supply/discharge means (the first fluid supply/discharge valve 21a or the second fluid supply/discharge valve 21b) is operated only when a desired shock-absorbing function cannot be obtained by means of the damping force of the suspension body (the damping force generating portion 19) (in the regions of time T in FIG. 9). Therefore, the capacity of each member providing the active system 20 can be minimized, and each member (the pump 22, the accumulator 18b and the first and second fluid supply/discharge valves 21a and 21b) can be provided for each wheel. Therefore, a number of pipes provided within the vehicle in the conventional active control can be eliminated. Further, a reduction in size of the apparatus is facilitated and mountability of the apparatus relative to the vehicle is enhanced.

Further, the first fluid supply/discharge valve 21a and the second fluid supply/discharge valve 21b can be switched automatically between the fluid discharge mode and the fluid supply mode according to the pilot pressure, so that calculation in the control device 25 is simplified. Therefore, a construction of the control device 25 and hence a construction of the suspension control apparatus can be simplified.

In the above-mentioned embodiments, the fluid supply/discharge valve 21 (the fluid supply/discharge means) is a flow rate control valve. However, a pressure control valve may be used, instead of the flow rate control valve.

Further, in the above-mentioned embodiments, vibration of the vehicle body 1 can be suppressed as desired, by generating a damping force equivalent to that of the skyhook damper 5 based on the skyhook theory. However, instead of generating a damping force equivalent to that of the skyhook damper 5 based on the skyhook theory, a damping force may be generated so as to be equivalent to the damping force based on a theory other than the skyhook theory.

Further, in the above-mentioned embodiments, the fluid is a hydraulic fluid. However, a fluid other than the hydraulic fluid may be used.

What is claimed is:

1. A suspension control apparatus comprising:
    a suspension body provided between a vehicle body and an axle of a vehicle and adapted to generate a variable damping force so as to perform a shock-absorbing function for the vehicle body;
    a fluid supply/discharge system for selectively supplying and discharging a fluid relative to the suspension body;
    a vibration monitoring device for monitoring vibration of the vehicle body; and
    a control means for controlling the shock-absorbing function by controlling the damping force of the suspension body and selectively supplying and discharging the fluid relative to the suspension body, in response to a signal emitted from the vibration monitoring device,
    wherein the control means is adapted to perform the shock-absorbing function by supplying and discharging the fluid through the fluid supply/discharge system relative to the suspension body when a satisfactory shock-absorbing function cannot be achieved by controlling the damping force of the suspension body.

2. A suspension control apparatus according to claim 1, wherein the control means controls the shock-absorbing function, based on the skyhook theory.

3. A suspension control apparatus according to claim 2, wherein the suspension body comprises a shock absorber of a type having damping force characteristics which reverse between an extension stroke and a compression stroke.

4. A suspension control apparatus according to claim 2, wherein said control means controls said fluid supply/discharge system so that it selectively supplies and discharges the fluid relative to the suspension body when the direction of a force required for the suspension body to exert based on the skyhook theory is opposite to the direction of the damping force generated due to the change in the length of said suspension body, the control being such that the fluid supplied to or discharged from the suspension body generates a force in the same direction as that required by the skyhook theory.

5. A suspension control apparatus according to claim 4, wherein said fluid supply/discharge system comprises a pump, a fluid line connecting the pump to said suspension body and a fluid supply/discharge valve disposed in said line between said pump and said suspension body and having a valve body, said valve including a pilot path to conduct the pressure in the line portion between said valve and the suspension body to said valve body and an electric adjusting means for shifting said valve body, and wherein, said electric adjusting means exerts a force to urge said valve body against the force imparted to the valve body by the pressure transmitted by said pilot path so the valve body is located in a neutral position and abrupt change of the stroke of said suspension body shifts said valve body due to change in the pressure transmitted by the pilot path so that the fluid is automatically supplied to or discharged from the suspension body.

6. A suspension control apparatus according to claim 1, wherein the suspension body comprises a shock absorber of a type having damping force characteristics which reverse between an extension stroke and a compression stroke.

7. A suspension control apparatus according to claim 1, wherein said fluid supply/discharge system comprises a pump, a fluid line connecting the pump to said suspension body and a fluid supply/discharge valve disposed in said line between said pump and said suspension body and having a valve body, said valve including a pilot path to conduct the pressure in the line portion between said valve and the suspension body to said valve body and an electric adjusting means for shifting said valve body, and wherein, said electric adjusting means exerts a force to urge said valve body against the force imparted to the valve body by the pressure transmitted by said pilot path so the valve body is located in a neutral position and abrupt change of the stroke of said suspension body shifts said valve body due to change in the pressure transmitted by the pilot path so that the fluid is automatically supplied to or discharged from the suspension body.

* * * * *